(12) United States Patent
Tiefenbach et al.

(10) Patent No.: US 9,595,704 B2
(45) Date of Patent: Mar. 14, 2017

(54) ELECTRICAL ENERGY STORAGE MODULE AND METHOD FOR PRODUCING AN ELECTRICAL ENERGY STORAGE MODULE

(71) Applicant: Robert Bosch GmbH, Stuttgart (DE)

(72) Inventors: Andy Tiefenbach, Vaihingen-Horrheim (DE); Thomas Proepper, Reutlingen (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/646,053

(22) PCT Filed: Nov. 18, 2013

(86) PCT No.: PCT/EP2013/074017
§ 371 (c)(1),
(2) Date: May 20, 2015

(87) PCT Pub. No.: WO2014/079790
PCT Pub. Date: May 30, 2014

(65) Prior Publication Data
US 2015/0303431 A1    Oct. 22, 2015

(30) Foreign Application Priority Data
Nov. 20, 2012  (DE) .......... 10 2012 221 124

(51) Int. Cl.
*H01M 2/20* (2006.01)
*H01M 2/10* (2006.01)
(Continued)

(52) U.S. Cl.
CPC ............ *H01M 2/202* (2013.01); *H01G 11/12* (2013.01); *H01G 11/76* (2013.01);
(Continued)

(58) Field of Classification Search
None
See application file for complete search history.

(56) References Cited

U.S. PATENT DOCUMENTS

2006/0275658 A1   12/2006   Sanada et al.
2011/0076521 A1    3/2011   Shimizu et al.
(Continued)

FOREIGN PATENT DOCUMENTS

DE   102010035114   4/2011
DE   102010064303   7/2012
(Continued)

OTHER PUBLICATIONS

Machine translation of Hagura et al. (JP 2003323874 A).*
(Continued)

*Primary Examiner* — Patrick Ryan
*Assistant Examiner* — Haixia Zhang
(74) *Attorney, Agent, or Firm* — Michael Best & Friedrich LLP

(57) ABSTRACT

The invention provides an electrical energy storage module (100), comprising: at least one storage cell stack (10), comprising: a plurality of energy storage cells (1), which each have a cell housing (1*a*) each having two pole connections (1*b*,1*c*), wherein the energy storage cells (1) are arranged in series in the storage cell stack (10) in such a way that in each case a first pole connection (1*b*) and a second pole connection (1*c*) having different polarities of two adjacent energy storage cells (1) are galvanically connected to one another by means of flat cell connecting elements (4), wherein the cell housings (1*a*) of all of the energy storage cells (1) are galvanically connected to one another, wherein the first pole connection (1*b*) of an energy storage cell (1) arranged at a first end of the storage cell stack (10) is galvanically connected to the cell housing (1*a*), and wherein
(Continued)

the second pole connection (1c) of an energy storage cell (1) arranged at a second end of the storage cell stack (10) and the cell housings (1a) each have a flat return conductor (5).

15 Claims, 2 Drawing Sheets

(51) Int. Cl.
*H01M 2/30* (2006.01)
*H01G 11/12* (2013.01)
*H01G 11/76* (2013.01)
*H01M 10/052* (2010.01)
*H01M 2/02* (2006.01)
*H01M 10/04* (2006.01)

(52) U.S. Cl.
CPC ....... *H01M 2/0285* (2013.01); *H01M 2/1016* (2013.01); *H01M 2/1022* (2013.01); *H01M 2/1077* (2013.01); *H01M 2/204* (2013.01); *H01M 2/206* (2013.01); *H01M 2/30* (2013.01); *H01M 10/04* (2013.01); *H01M 10/052* (2013.01); *H01M 2/021* (2013.01); *H01M 2/0292* (2013.01); *H01M 10/0481* (2013.01); *Y02E 60/13* (2013.01)

(56) References Cited

U.S. PATENT DOCUMENTS

| 2011/0129719 A1 | 6/2011 | Kwag et al. |
| 2012/0231324 A1 | 9/2012 | Brisbane |
| 2014/0011074 A1* | 1/2014 | Oda ........................ H01M 2/30 429/160 |

FOREIGN PATENT DOCUMENTS

| JP | 2003323874 A | * 11/2003 | |
| JP | 2009163932 | 7/2009 | |
| WO | WO 2012133654 A1 | * 10/2012 | .............. H01M 2/30 |

OTHER PUBLICATIONS

International Search Report for Application No. PCT/EP2013/074017 dated Feb. 19, 2014 (English Translation, 2 pages).

* cited by examiner

ELECTRICAL ENERGY STORAGE MODULE AND METHOD FOR PRODUCING AN ELECTRICAL ENERGY STORAGE MODULE

BACKGROUND OF THE INVENTION

The invention relates to an electrical energy storage module and a method for producing an electrical energy storage module.

Usually, direct current is drawn from electrical energy storage cells or direct current is fed into same. Therefore, the previously known design of energy storage cells is configured for the optimization of the nonreactive internal resistances and the specific energy or power density of the energy storage cells.

In many applications of electrical energy storage cells, storage cells are mutually interconnected in series or in parallel arrangement to form battery modules in order to set desired output parameters such as total electric voltage, electric voltage range, energy content or power density, for example. If currents with increasing AC component are drawn from such energy storage cells, an influence of distributed inductance of the energy storage cells increases as a function of frequency. In addition, at operating frequencies in the kHz range, losses can occur in the current-carrying regions and eddy currents can occur in electrically conductive surfaces, for example in the housing, owing to the skin effect.

DE 10 2010 035 114 A1 discloses a battery unit with a multiplicity of cell units which each have rechargeable battery cells that are electrically coupled via busbars.

There exists a demand for energy storage modules composed of one or more energy storage cells, which energy storage modules have lower losses with respect to high-frequency alternating currents being drawn and thus improve the efficiency of the system using the energy storage cells.

SUMMARY OF THE INVENTION

According to a first aspect, the invention provides an electrical energy storage module, comprising:
at least one storage cell stack having:
a plurality of energy storage cells which each have a cell housing with in each case two pole connections, wherein the energy storage cells in the storage cell stack are arranged in series such that in each case a first pole connection and a second pole connection with different polarities of two adjacent energy storage cells are electrically connected to one another by means of flat cell connection elements, wherein the cell housings of all of the energy storage cells are electrically connected to one another,
wherein the first pole connection of an energy storage cell arranged at a first end of the storage cell stack is electrically connected to the cell housing, and
wherein the second pole connection of an energy storage cell arranged at a second end of the storage cell stack and the cell housing each have a flat return conductor.

A preferred embodiment of the energy storage module according to the invention is distinguished in that the electrical connection between the cell housings of the energy storage cells is designed to be as low-resistance as possible. As a result, the low-loss use of the energy storage module in an AC mode can advantageously be provided.

Another preferred embodiment of the energy storage module according to the invention is characterized in that the plurality of energy storage cells is identically designed. As a result, owing to the uniform configuration of the energy storage cells, an overall energy storage module can advantageously be designed in a cost-effective manner since it is advantageously not necessary to redesign the energy storage cells.

Another preferred embodiment of the energy storage module according to the invention is characterized in that the first pole connection of the energy storage cell arranged at the first end of the storage cell stack has a flat cell connection element which is electrically connected to the cell housing of the corresponding energy storage cell. This offers the advantage of a cost-effective and low-loss electrical connection of an energy storage cell to the cell housing, which electrical connection is simple to realize.

Another preferred embodiment of the energy storage module according to the invention is distinguished in that the energy storage cell arranged at the first end of the storage cell stack has a first pole connection which is directly electrically connected to the corresponding cell housing. This enables an alternative configuration of the energy storage module, wherein, in this case, a pole connection of an individual energy storage cell is directly electrically connected to the cell housing. A cell connection element can advantageously be omitted here.

Another preferred embodiment of the energy storage module according to the invention is distinguished in that a thin insulating layer is formed between the return conductor which is electrically connected to the second pole connection and the corresponding cell housing. As a result, electrical insulation is advantageously provided between the cell housing and the pole connection of the energy storage cell, which electrical insulation ensures the operational safety of the energy storage module.

Another preferred embodiment of the energy storage module according to the invention is distinguished in that a fixing element is provided as return conductor for all of the energy storage cells and is electrically connected to all of the cell housings. In this way, a fixing element may advantageously be used both for mechanical fixing purposes and for the purpose of an electrical return line.

Another preferred embodiment of the energy storage module according to the invention is characterized in that the fixing element is a metal tension belt. In this way, a fixing element in the form of a metal tension belt which is already present can be used as electrical return line element.

Another preferred embodiment of the energy storage module according to the invention is distinguished in that, by a predefined pressing force on the fixing element, a contact junction between the cell housings can be optimized in terms of a total nonreactive resistance of the return line via the cell housing. In this way, an optimum contact resistance between the cell housings can advantageously be set by means of a predefined pressing force. Owing to the physical connection between the pressing force and the nonreactive resistance, this results in a well-suited dimensioning means for the contact resistance.

Another preferred embodiment of the energy storage module according to the invention is distinguished in that the electrical connections between the pole connections and the cell connection elements are welded connections. In this way, a minimum contact resistance can advantageously be realized over the operating time of the energy storage cells or of the energy storage module.

Another preferred embodiment of the energy storage module according to the invention is distinguished in that an insulating layer is applied to surfaces of the cell housing which do not border any surfaces of cell housings. In this way, protection or electrical insulation can advantageously be provided, which protection or electrical insulation may be realized, for example, as a coating layer.

According to a second aspect, the invention provides an electrical energy storage module, comprising:

at least one stack of a plurality of internals of energy storage cells with in each case two pole connections, wherein the internals of the energy storage cells are arranged in an overall housing, wherein in each case a separating layer is formed between the internals, wherein the energy storage cells in the stack are arranged in series such that in each case a first pole connection and a second pole connection with different polarities of two adjacent internals are electrically connected to one another, wherein the first pole connection of an internal arranged at a first end of the stack is electrically connected to the overall housing, and wherein the second pole connection of an internal arranged at a second end of the stack and the overall housing each have a flat return conductor. By means of the single overall housing for all of the internals of the energy storage cells, any possible problems with contact resistances between cell housings are advantageously omitted.

According to a third aspect, the invention provides a method for producing an electrical energy storage module, with the steps of:

alternately arranging energy storage cells with a cell housing and in each case two pole connections to form a storage cell stack, wherein the energy storage cells, in the position in which they are operated, are arranged in each case with an offset of 180 degrees with respect to one another;

connecting first and second pole connections of different polarity of two adjacent energy storage cells by means of flat cell connection elements;

making substantially completely flat contact between external surfaces of adjacent cell housings;

electrically connecting the first pole connection of an energy storage cell arranged at a first end of the storage cell stack to the corresponding cell housing; and electrically connecting a flat return conductor to a second pole connection of an energy storage cell arranged at a second end of the storage cell stack and a flat return conductor to the cell housing.

In the case of the present invention, it is considered to be particularly advantageous that a return line is effected via the cell housing of the energy storage cells, as a result of which separate return conductors are largely dispensed with. Owing to the fact that large contact surfaces are realized via the cell housing, an electrical contact resistance is small, as a result of which nonreactive losses can be kept low. An area enclosed between forward and return conductor and hence a resulting total inductance of the energy storage module can advantageously be minimized. In addition, space for further components (for example gas collector) can be provided in this way. Owing to the flat design of the cell connection elements and the return conductor, the energy storage module can be designed to be very low and hence space-saving.

Another considerable advantage of such an arrangement is considered to be that power loss, in particular when high-frequency alternating current is drawn from the energy storage module, can be significantly reduced. In particular, in the case of battery systems with integrated inverter, so-called battery direct inverters (BDI), in which a rapid change in the current direction through a battery module leads to variation of the voltage, said reduction in the power loss is very advantageous. The energy storage modules are advantageous with respect to the drawing of direct current, too, since they have reduced nonreactive losses owing to very low-resistance contact being made.

Moreover, by the avoidance of inductive loss components with the energy storage cells, an electromagnetic compatibility (EMC) can be improved since emitted electromagnetic fields can be reduced and disturbing influences on adjacent electronic components can be reduced as a result. Furthermore, nonreactive losses, for example owing to the skin effect, are meaningfully reduced, which advantageously effects an increased degree of efficiency and lower heat generation of the energy storage module.

BRIEF DESCRIPTION OF THE DRAWINGS

Further features and advantages of the present invention are explained below on the basis of embodiments with reference to the figures. All features described or illustrated form the subject matter of the invention by themselves or in any desired combination, independently of their summary in the patent claims or the dependency reference thereof, and independently of their wording or illustration in the description or in the figures. The figures are primarily intended to elucidate the principles essential to the invention, and are not necessarily to be understood as detailed circuit diagrams. In the figures, identical reference signs designate identical or functionally identical elements.

In the figures.

DETAILED DESCRIPTION

The direction terminology used below, that is to say terms such as "on the left", "on the right", "at the top", "at the bottom", "in front", "behind", "above the latter", "behind the latter", "first", "last" and the like, is used merely for the purpose of better understanding of the drawings and should not be considered in any case to constitute a limitation of the generality.

Electrical energy storage cells according to the present invention comprise all devices which can store electrical energy over a predefined time period and can output it again over a further time period. Energy storage cells, according to the present invention comprise here all types of secondary and primary energy stores, in particular electrically capacitive, electrochemical (Faraday's) and store types which operate in a combined fashion.

The time periods which are considered can comprise here from seconds up to hours, days or years. Electrical energy storage cells can comprise, for example, lithium-ion cells, lithium-polymer cells, nickel-metal hydride cells, ultra-capacitors, super-capacitors, power-capacitors, bat caps, rechargeable batteries based on lead, zinc, sodium, lithium, magnesium, sulfur or other metals, elements or alloys or similar systems. The functionality of the electrical energy storage cells which are included by the invention can be based here on intercalation electrodes, reaction electrodes or alloy electrodes in combination with aqueous, aprotic or polymer electrolytes.

Electrical energy storage modules according to the present invention comprise components which have one or more electrical energy storage cells which are arranged in a housing, for example, wherein the electrical energy storage cells are electrically coupled to one another in a suitable way in order to ensure serial or parallel connection of the energy storage cells. Electrical energy storage modules can have module connections at which an output voltage, dependent on the internal connection of the electrical energy storage cells of the electrical energy storage module, can be tapped.

Housings according to the present invention comprise all components which have a recess for accommodating one or more electrical energy storage cells and the electrically conductive connection elements of the electrical energy storage cells and which can screen the accommodated energy storage cells and elements mechanically and/or electrically from the outside world. Housings in this context can have electrically conductive materials or combinations of partial regions of such materials such as, for example, metals and alloys made of metals. The shape and size of the housings can be adapted here to the accommodated energy storage cells and elements.

Figure 1:
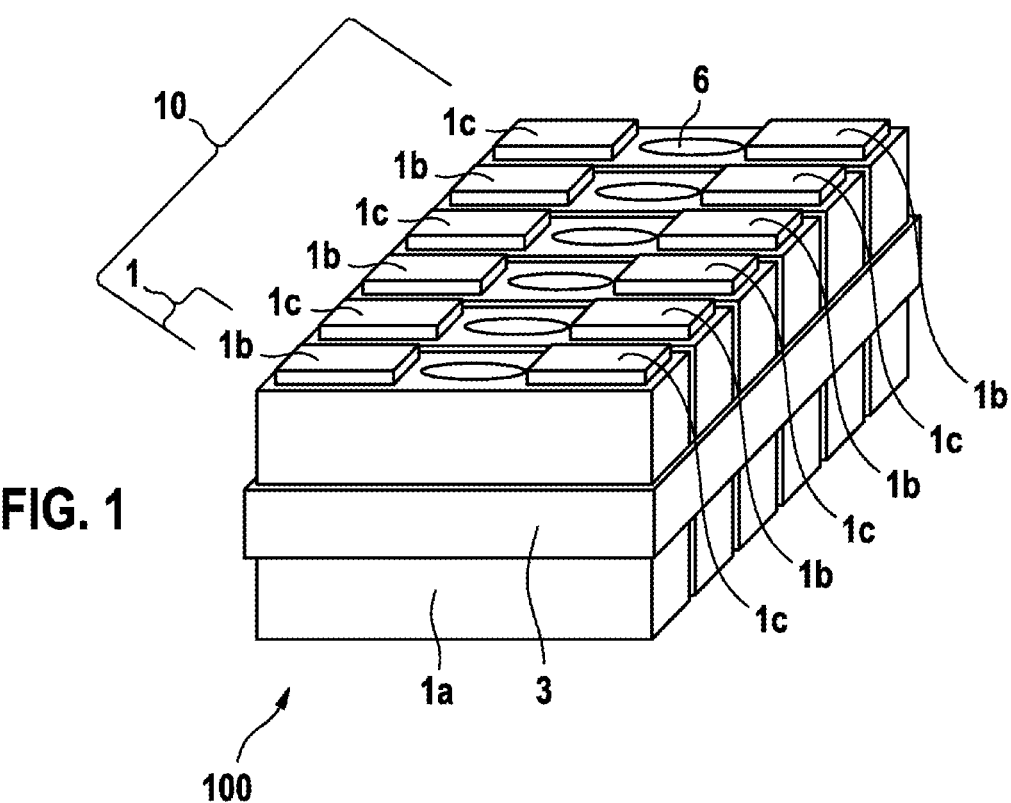
FIG. 1 shows a basic illustration of an energy storage module with energy storage cells.

FIG. 1 shows a perspective illustration of a basic embodiment of an electrical energy storage module 100 according to the invention. The energy storage module 100 has a storage cell stack 10 with a plurality (even or odd number) of energy storage cells 1, the adjacent cell housings 1a of which are in flat electrical contact with one another, wherein the energy storage cells 1 are arranged one behind the other in series to form a module structure. In the module structure, the energy storage cells 1 therefore touch at the side walls thereof and thus a conductive connection of all cell housings 1a can be produced.

The cell housings 1a are preferably made of metal, usually of aluminum and are electrically very highly conductive. First pole connections 1b (positive pole) and second pole connections 1c (negative pole) are in each case alternately arranged owing to an arrangement rotated by 180° of the energy storage cells 1. Both the first pole connections 1b and the second pole connections 1c are embodied in a manner electrically insulated from the respective cell housing 1a. A mechanical fixing element 3 which is used to mechanically fix all of the energy storage cells 1 is preferably designed as a metal tension belt.

Since the energy storage cells 1 mechanically expand when the energy storage cells 1 cycle, a pressing force is applied by means of the fixing element 3 to the whole storage cell stack 10, as a result of which the storage cell stack 10 can be permanently kept in a predefined shape. In addition, a conductive tension belt can be used, which is mechanically fixed to one of the cells and can also contribute to the enlargement of the conductive cross section. Furthermore, a contact junction between the cell housings 1a can be optimized, that is to say reduced as much as possible, in terms of a total nonreactive resistance of the return line via the cell housing.

By way of example, elliptical exhaust openings 6 on a top side of the energy storage cells 1 are used so that gas can escape from the energy storage cells 1 during operation of the energy storage cells 1 and, optionally, can be collected and conducted away by collection channels (for example gas collector, not illustrated) provided for this purpose.

Figure 2:
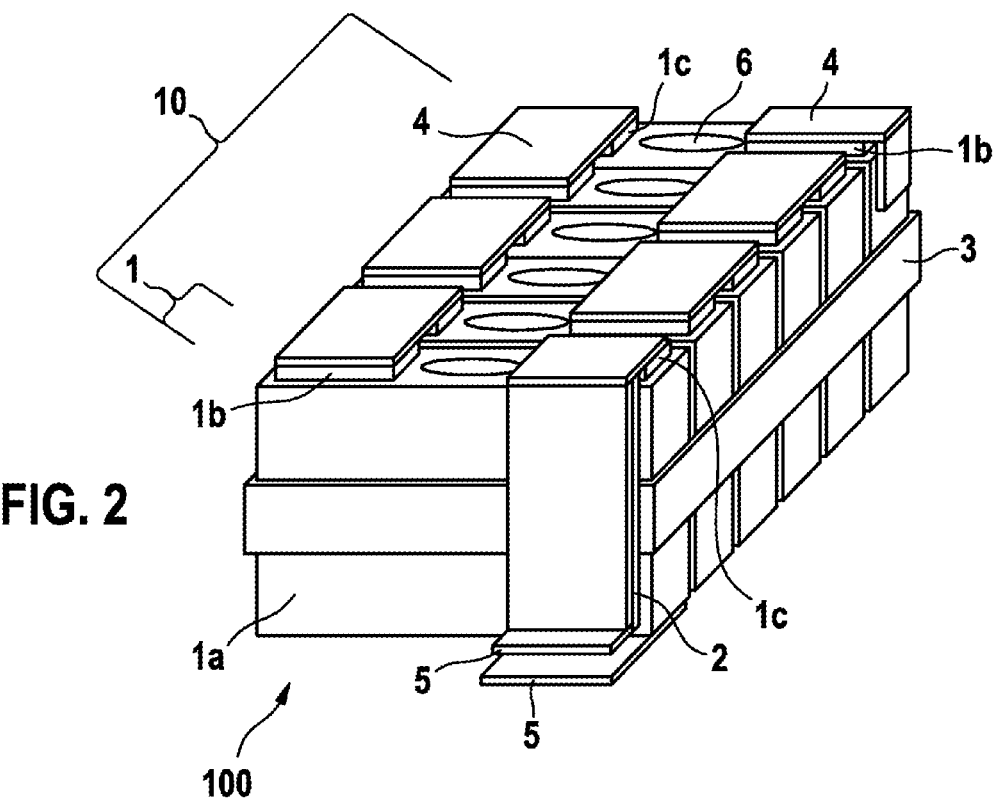
FIG. 2 shows a basic illustration of a first embodiment of the energy storage module according to the invention.

The realization of the electrical series circuit of the cells is implemented as shown in FIG. 2. FIG. 2 shows the storage cell stack 10 now with flat cell connection elements 4 which electrically connect pole connections 1b, 1c of different polarities of adjacent energy storage cells 1. The connections between the cell connection elements 4 and the pole connections 1b, 1c are in this case preferably designed as welded connections in order to enable an electrical resistance which is as low as possible over the entire operating time of the energy storage cells 1.

It can be seen on the rearmost energy storage cell 1 that an angular and flat cell connection element 4 electrically connects the first pole connection 1b to an end face of the corresponding cell housing 1a. In this way and owing to the fact that all of the cell housings 1a are in electrical contact with one another, all of the cell housings 1a are at the same potential as the first pole connection 1b.

It can be seen on the frontmost energy storage cell 1 that an angular and flat return conductor 5 is electrically connected to the second pole connection 1c of the frontmost energy storage cell 1 and, as a result, an electrical return line possibility from the second pole connection 1c is made possible. The connection from the return conductor 5 via the housing to a pole connection of the rearmost energy storage cell 1 can be made either laterally via a metal cell connection element 4 or at the back to the cell housing 1a or to the housing cover.

A thin insulation layer 2 is arranged between the cell housing 1a of the frontmost energy storage cell 1 and the return conductor 5. Alternatively, said insulation layer 2 may also be realized as a dielectric layer with simultaneously high dielectric constants. This effects a capacitive parallel path to the second pole connection 1c, as a result of which a total inductance of the corresponding energy storage cell 1 is advantageously further reduced. As a result, a further minimization of the inductive influence on module plane can be achieved.

As a result, it can also be seen that flat cell connection elements 4 are also provided, which enable the entire module structure of the energy storage cells 1 to be constructed in a flat manner. Owing to the short distance between the cell connection elements 4 and cell covers of the energy storage cells 1, an area enclosed by the forward and return conductors, and hence the resulting total inductance, is minimized.

All of the cell connections are preferably realized by welding in order to be able to realize the lowest contact resistance over the operating time. Alternatively, the return line from the module can also be implemented using the tension belt.

As a result, a contribution of the module inductance can advantageously be significantly reduced in comparison with a conventional storage cell stack. Furthermore, the arrangement according to the invention effects a particularly low-resistance module wiring through the use of the cell housing 1a as return conductor, and thus minimization of nonreactive losses which are converted into heat and which occur both in conventional DC operation and in AC operation, in particular in the form of losses from the skin effect.

What advantageously results is a minimization of the module inductance, as a result of which a reduced avalanche loading and power loss of the switches of the battery direct inverter (BDI) and reduced electromagnetic emissions can be achieved. Furthermore, a low-resistance module wiring can be achieved owing to shorter paths and areas. What is achieved as a result is an improved degree of efficiency of the overall system owing to a low-loss overall construction.

With the use of the metal cell housing, which is present anyway, as return conductor, it is possible to dispense with a separate return conductor. This advantageously leads to a saving in terms of material.

It is also advantageously conceivable to transfer the type of module contact-making from the energy storage cells 1 described here by way of example to capacitors of all types.

Figure 3:
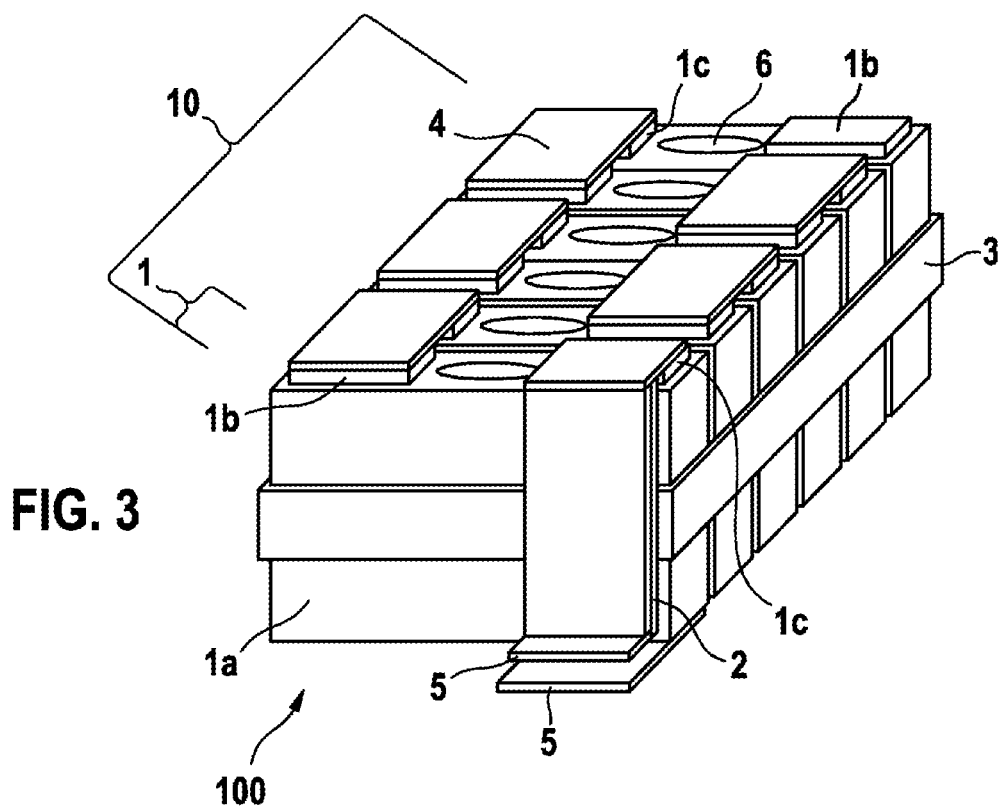
FIG. 3 shows a basic illustration of another embodiment of the energy storage module according to the invention.

An alternative embodiment of the energy storage module 100 according to the invention is illustrated in FIG. 3. Here, a single energy storage cell 1 (in the case of FIG. 3, the rearmost energy storage cell 1) is designed with a pole connection 1b which is directly electrically connected to the cell housing 1a. As a result, in this case, no externally applied cell connection to the housing 1a is necessary.

Toward the outside, where none of the housing surfaces of the cell housings 1a border one another, an insulation layer (not illustrated) can be applied, for example in the form of a coating, in order to protect and to electrically insulate surfaces of the cell housing 1a.

As a further alternative, instead of individual cells with individual metal housings, a common overall housing (not illustrated) could be used for all of the cells in the module, which common overall housing is used as return conductor. All of the cells are installed in said common overall housing, either without housings but with separating layers in order to divide the electrolyte or the cells are surrounded only with a film, comparable to an arrangement as is provided in the case of pouch cells.

The illustrated energy storage modules can preferably be used, for example, in systems in which high-frequency alternating currents are drawn from the energy storage cells, for example in battery direct inverters with drive frequencies above approximately 100 Hz. In said systems, it is possible to minimize the effect of inductive impedance contributions during AC operation owing to the design. At the same time, the response characteristic of the energy storage modules improves in the short-term range, which considerably improves the dynamics and reliability of the system.

Figure 4:
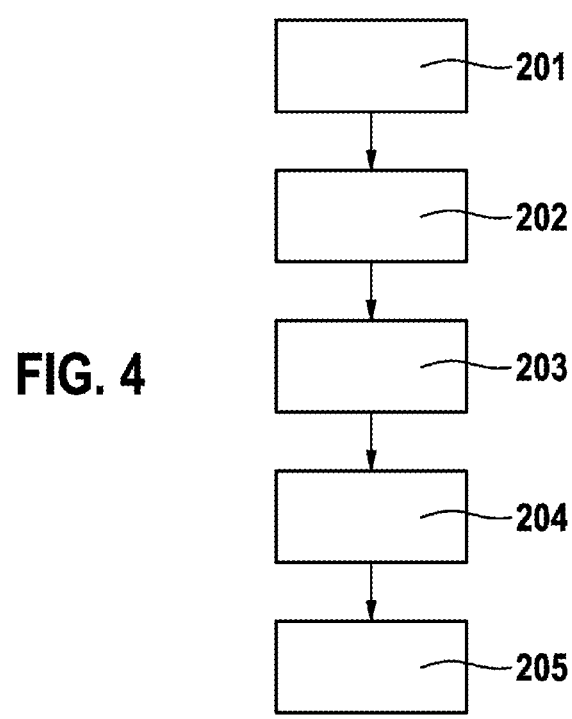
FIG. 4 shows a schematic illustration of a process of an embodiment of the method according to the invention.

FIG. 4 shows a schematic illustration of a method for producing an electrical energy storage module, in particular one of the energy storage modules 100 shown schematically in FIGS. 2 and 3.

In a first step 201, energy storage cells 1 with a cell housing 1a and in each case two pole connections 1b, 1c are alternately arranged to form a storage cell stack 10, wherein the energy storage cells 1, in the position in which they are operated, are arranged in each case with an offset of 180 degrees with respect to one another.

In a second step 202, first and second pole connections 1b, 1c with different polarity of two adjacent energy storage cells 1 are connected by means of flat cell connection elements 4.

In a third step 203, substantially completely flat contact is made between external surfaces of adjacent cell housings 1a.

In a fourth step 204, the first pole connection 1b of an energy storage cell arranged at a first end of the storage cell stack 10 is electrically connected to the corresponding cell housing 1a.

In a fifth step 205, a flat return conductor 5 is electrically connected to a second pole connection 1c of an energy storage cell 1 arranged at a second end of the storage cell stack 10 and a flat return conductor 5 is electrically connected to the cell housing 1a.

In summary, the invention provides an arrangement of a plurality of energy storage cells which are arranged in a module structure in a low-loss manner with respect to later operation, wherein electrical wiring including the module supply and return conductors is provided, which electrical wiring is designed to be particularly low-inductance and low-resistance.

Although the present invention has been described with reference to preferred exemplary embodiments, it is not restricted thereto. In particular, the stated materials and topologies are merely by way of example and are not restricted to the explained examples.

A person skilled in the art will therefore be able to modify the described features of the invention or combine said features with one another without deviating from the core of the invention.

What is claimed is:

1. An electrical energy storage module comprising:
    a storage cell stack including
        a plurality of energy storage cells each having a cell housing, a first pole connection, and a second pole connection, wherein the first pole connection and the second pole connection have different polarities, all the first pole connections have the same polarity, and all the second pole connections have the same polarity, wherein the plurality of energy storage cells are arranged in series, wherein the cell housings of all of the plurality of energy storage cells are electrically connected to one another, wherein the plurality of energy storage cells includes a first energy storage cell at a first end of the storage cell stack and a second energy storage cell at a second, opposite end of the storage cell stack, wherein the first end is opposite the second and, wherein the first pole connection of the first energy storage cell is electrically connected to the cell housing of one of the plurality of energy storage cells, and
        a plurality of flat cell connection elements,
        wherein, for each adjacent pair of energy storage cells, the first pole connection of one of the adjacent pair of energy storage cells is electrically connected to the second pole connection of the other of the adjacent pair of energy storage cells by one of the plurality of flat cell connection elements;
    a first flat return conductor directly electrically connected to the second pole connection of the second energy storage cell; and
    a second flat return conductor directly electrically connected to the cell housing of one of the plurality of energy storage cells.

2. The energy storage module as claimed in claim 1, wherein each of the energy storage cells of the plurality of energy storage cells are identically designed.

3. The energy storage module as claimed in claim 2, wherein the first pole connection of the first energy storage cell has a flat cell connection element which is electrically connected to the cell housing of the first energy storage cell.

4. The energy storage module as claimed in claim 1, wherein the first pole connection of the first energy storage cell is directly electrically connected to the cell housing of the first energy storage cell.

5. The energy storage module as claimed in claim 1, wherein an insulating layer is formed between the first flat return conductor the cell housing of the second energy storage cell.

6. The energy storage module as claimed in claim 1, wherein a fixing element is provided as the second flat return conductor, and wherein the fixing element is directly electrically connected to the cell housings of each of the plurality of energy storage cells.

7. The energy storage module as claimed in claim 6, wherein the fixing element is a metal tension belt positioned about the plurality of energy storage cells.

8. The energy storage module as claimed in claim 6, wherein a predefined pressing force is exerted on the fixing element so that a contact junction between the cell housings is optimized in terms of a total nonreactive resistance of a return line via the cell housings.

9. The energy storage module as claimed in claim 1, wherein the electrical connections between the first and second pole connections and the cell connection elements are welded connections.

10. The energy storage module as claimed in claim 1, wherein an insulating layer is applied to surfaces of the cell housing which do not border any surfaces of the cell housings of adjacent energy storage cells.

11. The energy storage module as claimed in claim 1, wherein the first pole connection of the first storage cell is electrically connected to the cell housing of the first storage cell.

12. The energy storage module as claimed in claim 1, wherein the first pole connection of the first storage cell is electrically connected to the cell housing of the first storage cell by a flat cell connection element.

13. The energy storage module as claimed in claim 1, wherein the second flat return conductor is directly electrically connected to the cell housing of the second energy storage cell.

14. The energy storage module as claimed in claim 1, wherein the first pole connections are positive, and wherein the second pole connections are negative.

15. The energy storage module as claimed in claim 1, wherein the first pole connection and the second pole connection are electrically insulated from the pole housing of their respective energy storage cell.

* * * * *